United States Patent Office 3,284,236
Patented Nov. 8, 1966

3,284,236
METHOD OF COATING A METAL SURFACE WITH A FERRITE COMPOSITION
Anthony N. Schmitz, Levittown, N.J., assignor, by mesne assignments, to the United States of America as represented by the Secretary of the Army
No Drawing. Filed June 26, 1963, Ser. No. 290,865
6 Claims. (Cl. 117—230)

This invention relates to a method for applying a ferrite coating to metal surfaces. More particularly, the invention relates to a method of applying a ferrite coating to metals, the coatings being resistant to heat and thermal shock.

Ferrite coatings have many uses in the field of electronics as, for example, ferrite duplexers, phase shifters, variable attenuators, multimode loads, and dummy loads. The present invention provides a method for obtaining ferrite coatings which are capable of withstanding temperatures up to 600° F. As used herein, the term ferrite refers to iron having less than 0.025% by weight carbon as a solid solution therein.

The metals to be coated according to the present process will generally be of the art-recognized class of conductors such as aluminum, copper, and the like since the coated metals normally will be utilized with electronic devices.

In accordance with the foregoing, it is an object of the present invention to provide a method of applying a ferrite coating to metal surfaces.

A further object of the invention is to provide a method of applying ferrite coatings to metal surfaces whereby the resulting ferrite coatings are resistant to heat and thermal shock.

The manner in which these and other objects may be accomplished will become apparent from the following detailed discussion.

A suitable ferrite composition for application according to the present method is prepared by thoroughly mixing in any suitable container 35% to 45% by weight of a fine mesh ferrite powder (150 mesh or smaller), 35% to 45% by weight ethyl silicate, and 15% to 25% by weight silica. All the ingredients are standard commercially available items. A preferred composition comprises a well-stirred mixture of 40% by weight 300 mesh ferrite powder, 40% by weight ethyl silicate, and 20% by weight silica. The composition is prepared by adding the three ingredients together in a suitable container with mixing. Care should be exercised to prevent beating air bubbles into the mixture as this could produce voids in the ferrite coating.

The metal surface to which the coating is to be applied should be thoroughly cleaned according to established techniques. Sand-blasting, degreasing, and pickling operations are examples of the methods available to clean the metal surfaces to be coated.

According to the present invention, a ferrite composition, of the type described above, is applied to the metal surface in a thin, even layer of about 0.010 inch to 0.015 inch in thickness in a controlled humidity chamber at room temperature (about 68° F. to 72° F.) where the relative humidity is maintained at from 50% to 90% and preferably from 60% to 80%. The coatings may be applied by dipping, brushing, knife-coating, or any other suitable means. The coatings are then air dried at 68° F. to 78° F. until thoroughly dried, usually 8 hours to 24 hours. At higher temperatures, as for example 100° F. to 120° F., the time for air drying can be decreased. Curing of the coating is completed by baking in an oven at 250° F. to 350° F. for a period of time sufficient to insure bonding of the ferrite coating to the metal, usually 8 hours to 24 hours. If a thicker coating is desired, the process is repeated one or more times until the necessary thickness is acquired. Each additional coating should be carried through the baking operation before adding a subsequent coating. The ferrite coating thus produced is resistant to thermal shock and heat up to 600° F.

The critical feature in the process is the regulation of the relative humidity during the application of each ferrite coating. It has been determined that coatings which are applied when the relative humidity is less than 50% exhibit poor and inconsistent bonding between the coating and the metal.

To better illustrate the method of the invention, a waveguide dummy load at L-Band frequencies is prepared as follows:

A clean rectangular shaped metal wave guide is placed in a controlled humidity chamber at room temperature (about 68° F.) where the relative humidity is 70%. A ferrite composition comprising an intimate mixture of 40% by weight 300 mesh ferrite powder, 40% by weight ethyl silicate, and 20% by weight purified silica is brushed on the inside surface of one narrow wall of the wave guide. After allowing the coating to set about two hours, the inside surface of the opposite narrow wall is coated. The inside surface of the two broad walls are coated in a similar manner allowing about two hours for each previous coating to set before applying a coating to another wall. The coatings are spread on evenly to a thickness of about 0.010 inch. The reason for allowing each coating to set before applying coatings to other surfaces is to help prevent marring the surface of the coating on one wall while applying a coating to another wall. After setting, the coating offers some resistance to marring. When the interior surfaces of all four walls have been coated, the wave guide is air dried at about 70° F. for 16 hours and thereafter baked in an oven at 300° F. for an additional 16 hours. Two additional coatings of ferrite are then applied by repeating the process. The resulting ferrite coating on the wave guide is then coated with a thin coat of silicon resin to protect it against the detrimental effects of moisture, if desired.

The above description is for the purpose of illustration only and no undue limitation is intended except as reflected in the appended claims.

I claim:
1. The method of providing a ferrite coating for metal surfaces, said method comprising:
   (a) applying a thin even coating of a ferrite composition to said metal surface at room temperature while maintaining the relative humidity within the range of 50% to 90%, said ferrite composition consisting essentially of 35% to 45% by weight powdered ferrite, 35% to 45% ethyl silicate, and 20% by weight silica;
   (b) air drying said coating;
   (c) subsequently baking said coating at a temperature of 250° F. for a time sufficient to insure bonding of said ferrite coating to said metal surface.
2. The method according to claim 1, wherein the procedures of (a) through (c) are repeated to increase the thickness of said coating.
3. The method according to claim 1, wherein said coating is applied in thin, even layers of about 0.010 inch to 0.015 inch in thickness.
4. The method according to claim 1, wherein said relatively humidity is maintained at 60% to 80%.
5. The method of providing a ferrite coating for metal surfaces, said method comprising:
   (a) applying a thin, even coating of ferrite composition to said metal surface at room temperature while maintaining the relative humidity within the range of 60% to 80%, said ferrite composition consisting essentially of about 40% by weight powdered ferrite, 40% by weight ethyl silicate, and 20% by weight silica, said coating of ferrite composition being from about 0.010 inch to about 0.015 inch in thickness;
(b) air drying said coating at room temperature;
(c) subsequently baking said coating at about 300° F. for a period of time sufficient to insure bonding of said ferrite coating to said metal surface.

6. The method according to claim 5, wherein the procedures of (a) through (c) are repeated to increase the thickness of said coating.

References Cited by the Examiner

UNITED STATES PATENTS 1,997,193  4/1935  Kato et al. _____ 252—62.5

FOREIGN PATENTS 162,930  5/1955  Australia.

OTHER REFERENCES

Brown et al.: IBM Technical Disclosure Bulletin, vol. 2, No. 4, December 1959, p. 16, TK7800I 13.

ALFRED L. LEAVITT, *Primary Examiner.*

R. S. KENDALL, *Assistant Examiner.*